A. F. PAUL & A. J. TANNER.
PASSENGER VEHICLE.
APPLICATION FILED SEPT. 19, 1913.
1,141,408.
Patented June 1, 1915.
2 SHEETS—SHEET 1.
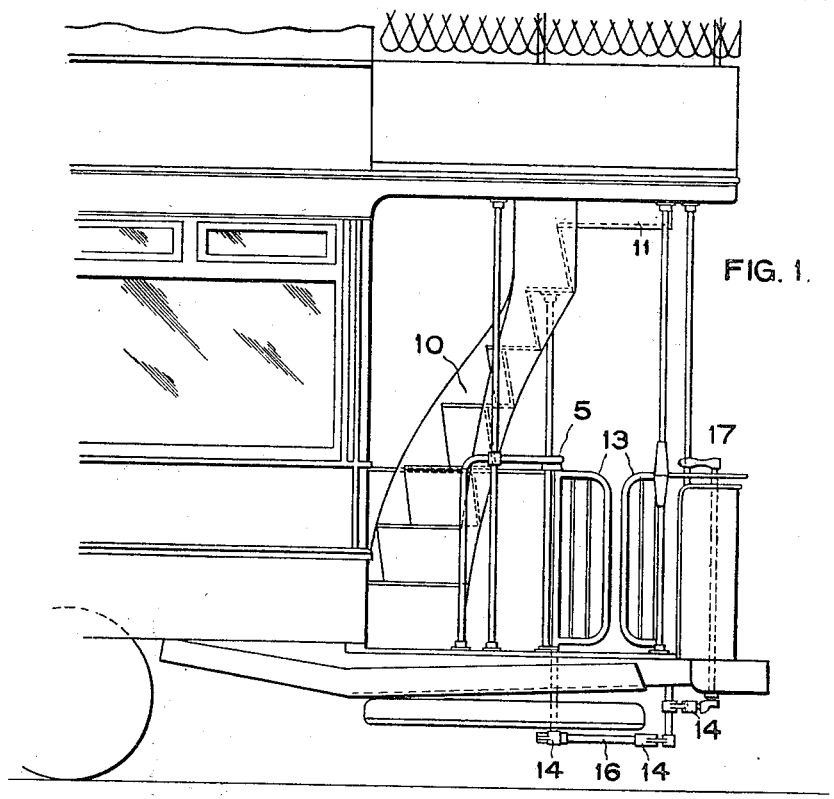
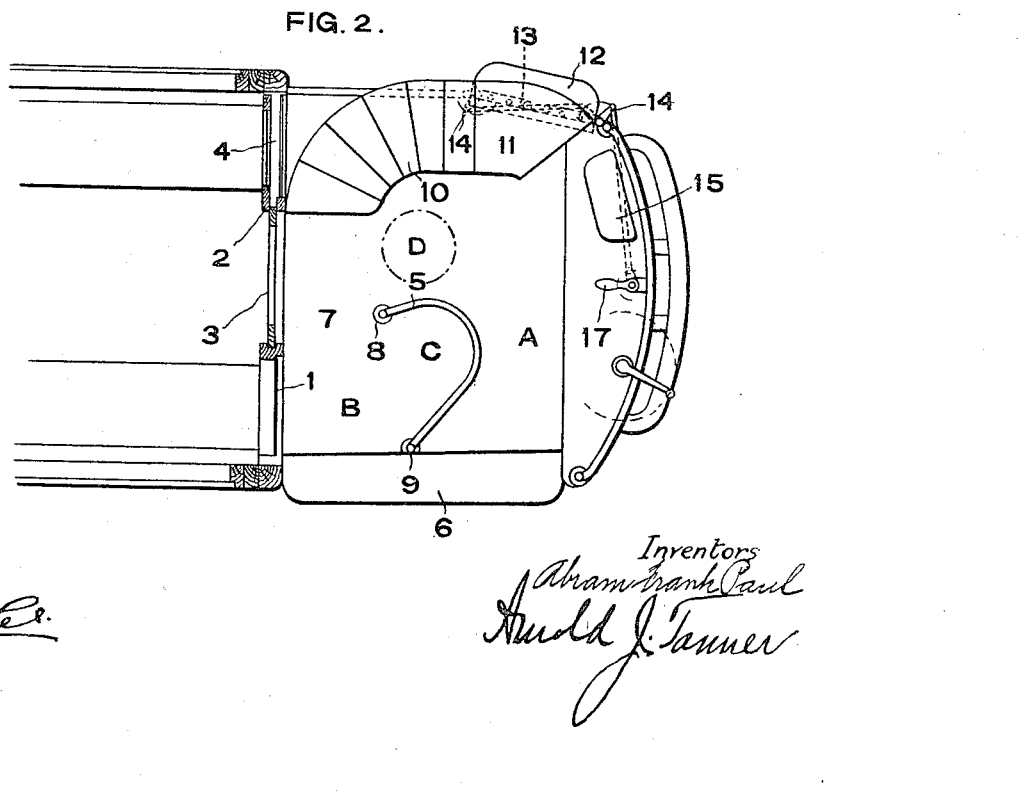
Witnesses
Inventors

A. F. PAUL & A. J. TANNER.
PASSENGER VEHICLE.
APPLICATION FILED SEPT. 19, 1913.

1,141,408.

Patented June 1, 1915.
2 SHEETS—SHEET 2.

Witnesses
Roysting
B. H. Fowler.

Inventors
Abram Frank Paul
Arnold J. Tanner

UNITED STATES PATENT OFFICE.

ABRAM FRANK PAUL, OF PHILADELPHIA, PENNSYLVANIA, AND ARNOLD J. TANNER, OF NORTH HAVEN, CONNECTICUT, ASSIGNORS TO PREPAYMENT CAR SALES COMPANY, OF NEW YORK, N. Y., A CORPORATION OF WEST VIRGINIA.

PASSENGER-VEHICLE.

1,141,408.   Specification of Letters Patent.   Patented June 1, 1915.

Application filed September 19, 1913. Serial No. 790,700.

*To all whom it may concern:*

Be it known that we, ABRAM FRANK PAUL and ARNOLD JAMES TANNER, both citizens of the United States, and residing at Philadelphia, county of Philadelphia, State of Pennsylvania, and North Haven, county of New Haven, State of Connecticut, respectively, have invented new and useful Improvements in Passenger-Vehicles, of which the following is a specification.

Our present invention relates to tramcars, omnibuses and other public passenger conveyances, and the improvements are particularly useful for such services in connection with which a prepayment system of fare collection is employed.

One object of the invention is to provide means whereby a vehicle can be constructed or a vehicle in use re-constructed or readily modified so that the means employed with a prepayment fare system can be applied to vehicles having an upper deck or saloon and a stairway on the platform communicating with the upper deck.

A construction has been heretofore proposed and patented having an arrangement of the platform including a barrier or guide rail fixed thereon, by means of which guide rail the platform step is divided into ingress and egress sections, and the guide rail also establishes an individual position for the conductor. The conductor remains stationed at this point during a journey, and controls the ingress and egress of passengers, and at the same time attends to the collection of the fares. A partition or bulkhead separates the platform from the interior of the car, and an entrance and exit communicating respectively with the entrance and exit sections of the platform are provided in said bulkhead.

The invention will be hereinafter more fully described with reference to the accompanying drawings, in which—

Figure 3:
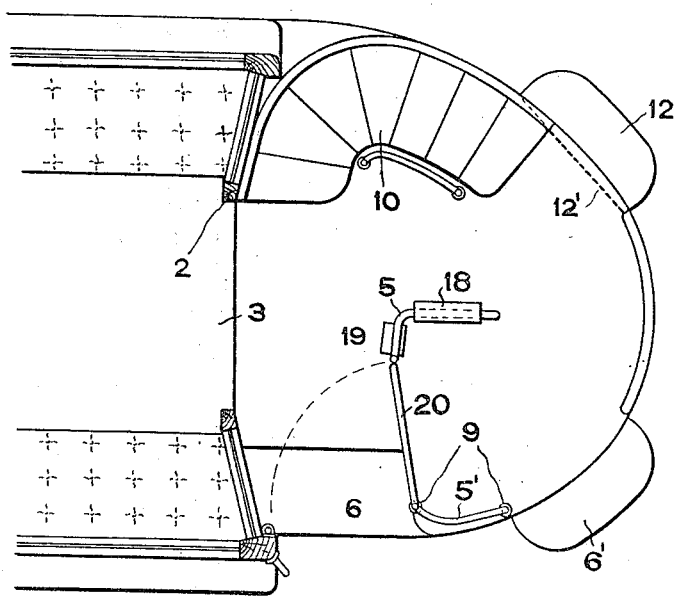
Figure 4:
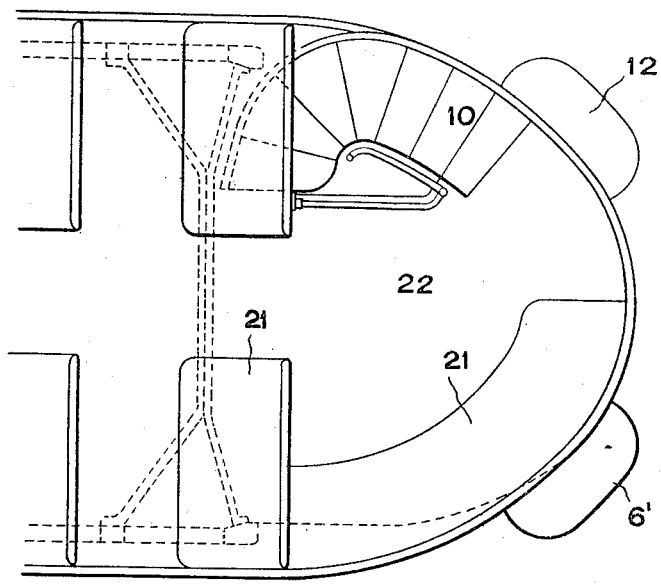

Figure 1 is a side elevation of the end of a tramcar embodying the invention in one form; Fig. 2 is a plan view of the same construction; Fig. 3 is a plan view of a modification and illustrates the lower deck of a tramcar or omnibus, and Fig. 4 is a plan view of the same construction illustrating the upper deck of the vehicle.

Referring to Figs. 1 and 2 of the drawings, the end bulkhead 1 on either or both ends of the vehicle is of the usual shape, being straight across the width of the vehicle, and is provided with a centrally located doorway 2 having a door 3 therefor, which door slides in the pocket 4 at one side of the bulkhead. A guide rail 5 mounted on the platform extends from a point at or near the step 6 at the side of the platform to a point sufficiently at a distance away from the doorway in the bulkhead to allow ample room for a clear passageway 7 between the stanchion 8 and the door 3 when the latter is closed. The purpose of the guide rail is to define a conductor's station and separate entrance and exit passageways or spaces on the platform, the entrance space A commencing at the entrance side of the step 6 and the exit space B terminates at the other side of the step 6, which step is divided by the usual vertical stanchion 9.

The stairway 10 is situated within the entrance space on the platform and the lower step of the stairway is adjacent to the opening 2 in the bulkhead. The lower step is in direct line with the passage 7, thereby descending passengers are given a straight path to the exit side of the step 6. The stairway 10 is arranged in a reverse direction to the usual style of stairway, *i. e.*, the lower step is up against the bulkhead and the upper step or landing 11 is at the end of the vehicle. By this arrangement of the stairway additional space is gained on the platform, and consequently a greater number of passengers can be accommodated in the entrance space on the platform, thereby facilitating a successful carrying out of a prepayment system of fare collection. As stated, the lower step of the stairway 10 is in direct line with the exit side of the step 6, therefore outgoing passengers from the top deck conveniently mingle with the outgoing passengers from the interior of the car, but at no time will the outgoing passengers mingle with the incoming passengers and thus obstruct the entrance passageway. This is an essential feature with prepayment passenger vehicles, for thereby a number of passengers may board the vehicle and congregate in the entrance space A, and the conductor from his defined station C within the bend of the rail 5, can keep the incoming passengers back until the outgoing passengers have left the vehicle.

To establish the best operative conditions for fare prepayment vehicles and according to this invention, the bottom step of the stairway is situated inside or beyond what is termed the "pay-point", represented by the dotted circle D, for by this arrangement the conductor can readily stop the incoming passengers and prevent them from obstructing the passage of the outgoing passengers, and also, as all fares are collected at this point, there is no chance for passengers to ascend the stairs unobserved by the conductor no matter how crowded the platform may be.

It has been found in practice that it is often desirable to let the passengers from the top deck leave the car by the front platform, particularly at termini of a tramway or omnibus route where a great number of passengers are usually taken on or unloaded. For this purpose an emergency or auxiliary exit and step 12 is provided on the far side or side of the platform where the stairway is situated, the exit being under the landing 11, so that passengers leaving the car by means of this exit must pass under this landing. The step 12 may be raised or lowered in the usual manner and gate 13 is employed to close the exit, which gate is made in two sections which swing inwardly on pivots, and by means of power transmission devices the gate may be opened and closed from a distant point. The gate operating mechanism consists of cranks 14, connecting rods 15, and links 16, which mechanism is operated by the attendant by means of the handle 17 located at the end of the car.

Referring now to Figs. 3 and 4, this construction is more suitable for an omnibus but may be also used for a tramcar if desired. In this instance the bulkhead 2 having the central opening 3, extends inwardly toward the interior of the car, and the stairway 10 is close up against the bulkhead, the lower step thereof being adjacent to the central opening, and the upper step is at the end of the vehicle as previously described. In this modification the entrance and exit passageways on the platform are defined by means which also perform other functions. A short length of rail is employed and this rail serves as a stand for a ticket machine 18 and ticket box 19. The continuation of the barrier is formed by the gate 20 which is operated directly by the conductor for the purpose of opening or closing the passage to the exit step 6, which is separate and away from the entrance step $6^1$, having an intervening section of a rail $5^1$ supported between the two stanchions 9. In this modification if desired an emergency exit 12 may also be provided, and as illustrated instead of the gate an ordinary chain or barrier $12^1$ may be employed.

The construction and location of the stairway as hereinbefore described permits a better arrangement of the seats 21 on the upper deck of the vehicle, and a greater number of passengers can be accommodated. Also more room is allowed in the passage 22 for the outgoing and incoming passengers to pass one another.

It will be understood that the inwardly extending concave or angular bulkhead as above described is of particular advantage where it is not permissible to extend the platform beyond a limited length, but in such instances where the platform can be extended outwardly an ordinary straight bulkhead across the width of the car may be employed.

We claim:—

1. A double deck passenger vehicle having an end platform and a stairway thereon the lowest step of the stairway being adjacent to the end bulkhead of the vehicle which stairway is located wholly on one side of the car and rises toward the end of the car and an exit on the same side of the car under the top landing of said stairway, substantially as described.

2. A double deck passenger vehicle having an end platform and a stairway thereon the lowest step of the stairway being adjacent to the end bulkhead of the vehicle which stairway rises toward the end of the car, an exit at the side of the car under the top landing of said stairway, a gate or barrier for opening and closing the exit and mechanism consisting of a handle, links, and levers for operating the gate from a distant point, substantially as described.

3. A passenger vehicle having a body portion and an end platform with an intervening bulkhead, a rail or barrier on the platform dividing the same into entrance and exit spaces communicating with entrance and exit steps on one side of the platform, a stairway located on the other side of the platform within the entrance space with the base of the stairway opposite the exit step, a passage defined from the lowest step of the stairway to the said exit step, the stairway rising away from the said bulkhead, and an exit on the same side of the car with the stairway and located beneath the top landing of the stairway, substantially as described.

4. A passenger vehicle having a platform divided into separate entrance and exit spaces by means of a barrier which establishes a conductor's position and a "pay-point" for passengers, and a stairway on the platform located within the entrance space and having its lower step opposite the exit space only and beyond the "pay-point" and opposite a defined passageway leading to the exit step aforesaid, substantially as described.

In witness whereof we have signed our names to this specification in the presence of two subscribing witnesses.

ABRAM FRANK PAUL.
ARNOLD J. TANNER.

Witnesses:
H. D. JAMESON,
TRACY LAY.

Copies of this patent may be obtained for five cents each, by addressing the "Commissioner of Patents, Washington, D. C."